United States Patent [19]

Kerscher et al.

[11] 4,234,062

[45] Nov. 18, 1980

[54] MECHANICAL RELEASE MECHANISM FOR A SPRING-LOADED BRAKE CYLINDER

[75] Inventors: Albert Kerscher, Eching; Walter Furtner, Rosenheim, both of Fed. Rep. of Germany

[73] Assignee: Knorr-Bremse GmbH, Munich, Fed. Rep. of Germany

[21] Appl. No.: 17,108

[22] Filed: Mar. 5, 1979

[30] Foreign Application Priority Data

Mar. 3, 1978 [DE] Fed. Rep. of Germany ....... 2809263

[51] Int. Cl.³ ............................................ F16D 59/02
[52] U.S. Cl. ..................................... 188/170; 188/265
[58] Field of Search ...................... 92/29, 30; 188/170, 188/265; 303/89

[56] References Cited

U.S. PATENT DOCUMENTS

| | | | |
|---|---|---|---|
| 3,977,304 | 8/1976 | Meissner | 188/170 X |
| 3,994,206 | 11/1976 | Dahlkuist et al. | 188/170 X |
| 4,036,111 | 7/1977 | Dahlkuist et al. | 188/170 X |

*Primary Examiner*—Duane A. Reger
*Attorney, Agent, or Firm*—Edmund M. Jaskiewicz

[57] ABSTRACT

A brake cylinder has a piston one side of which is spring-loaded and the other side of which is acted upon by a fluid pressure medium. A spindle shaft is coupled t the cylinder by a screw coupling having a non-self-locking thread and is engageable with an actuating rod which is adapted to be connected to the brake linkage. A sleeve is rotatably mounted on the cylinder but is non-axially movable with respect to the cylinder. The sleeve is axially but non-rotatably slideable with respect to the spindle shaft. An overrunning drive is operatively connected between the sleeve and a drive mechanism which is operable exteriorly of the brake cylinder. The drive locks in the driving position when the sleeve rotates in a direction to unscrew the spindle shaft from the piston in the direction to release the brake.

2 Claims, 6 Drawing Figures

MECHANICAL RELEASE MECHANISM FOR A SPRING-LOADED BRAKE CYLINDER

The present invention relates to a release mechanism for a spring-loaded brake cylinder such as used in an air braking system on a rail vehicle, more particularly, to a mechanical release mechanism which becomes effective without the necessity for overcoming the force of the storage spring.

In known mechanical release mechanisms for spring-loaded brake cylinders the release or removal of the clamping force effecting the braking action has been generally accomplished by varying the degree to which the storage spring is stressed. Many such release mechanisms engage the piston rod or a tubular piston member extending from the spring-loaded brake cylinder to compress the storage spring or springs together into their positions corresponding to the release position of the brake.

The force which is necessary to be applied by the release mechanism in order to overcome the force exerted by the storage springs is relatively great and imposes a considerable stress on the individual components of the release mechanism. When the release mechanism is to be operated manually, considerable force must be exerted by the person operating the release mechanism.

It has been proposed to provide a spring-loaded brake cylinder in which the spring-loaded piston can be returned to the release position by means of a selectively operable drive mechanism mounted on the cylinder housing. In this brake cylinder there is further provided a rotatable but non-axially displaceable spindle connected with the spring-loaded piston by means of a non-rotatable nut on a non-self-locking thread against the force of the storage spring. In order to assure that the spring-loaded piston will operate in a normal manner after the pressurized air supply has been restored to proper operation, this braking cylinder includes several couplings and a toothed coupling operatively disposed between the spring-loaded piston and the selectively operable drive mechanism.

The manufacture, assembly and proper adjustment of these couplings which are constructed of different structural elements is relatively complicated and requires considerable skilled labor. In addition, the components which participate in the release of the storage spring must be dimensioned and even over-dimensioned so as to have sufficient strength in order to overcome the storage spring forces.

It is therefore the principal object of the present invention to provide a novel and improved release mechanism for a spring-loaded brake cylinder particularly in an air braking system on a rail vehicle.

It is another object of the present invention to provide a mechanical release mechanism for such a spring-loaded brake cylinder which is effective without the necessity of overcoming the force of the storage spring such that the spring-loaded piston is shifted to its starting or release position at the time when the normal pressurized air supply is restored.

It is an additional object of the present invention to provide such a mechanical release mechanism whose components need not act upon the force of the storage springs during the release operation and wherein the spring-loaded piston returns to its release position to stress the storage springs by relatively simple structure upon restoration of the normal pressurized air supply.

According to one aspect of the present invention a release mechanism for a spring-loaded brake cylinder particularly in an air braking system in a rail vehicle may comprise a cylinder having a piston therein which is movable in braking and release directions. One side of the piston is acted upon by a spring and the other side acted upon by a fluid pressure medium. A spindle shaft having a non-self-locking thread is threadedly coupled to the piston and is engageable with an actuating rod adapted to be connected to a brake linkage. A sleeve is rotatably mounted on the cylinder and is non-axially movable with respect to the cylinder. The spindle shaft is axially movably connected to the sleeve but is non-rotatable with respect to the sleeve. Overrunning drive means is operatively connected between a drive mechanism operable exteriorly of the brake cylinder and the sleeve is capable of being locked in the driving position when the sleeve rotates in a direction to unscrew the spindle shaft from the piston in the direction to release the brake.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
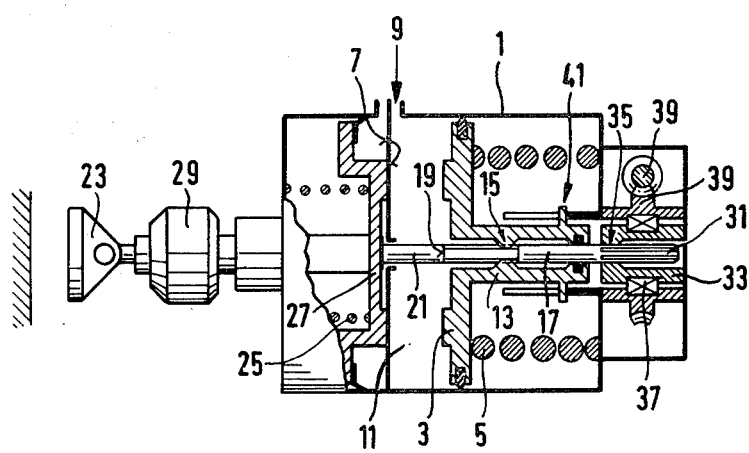
FIG. 1 is a schematic longitudinal cross-section view through a spring-loaded brake cylinder incorporating the mechanical release mechanism according to the present invention and the components are shown in the release position as established by a fluid pressure medium acting upon the spring-loaded piston.

As may be seen in FIG. 1, a spring-loaded brake cylinder comprises a cylinder housing 1 in which a spring-loaded piston 3 is slideable in braking and release directions. A storage spring 5 supported on one end of the cylinder housing 1 acts upon one side of the piston 3 to spring-load the piston. The cylinder housing 1 is divided by a wall or partition 7 into a spring-loaded brake cylinder housing the spring-loaded piston 3 and an operating brake cylinder in which is slideably positioned a braking piston 27. A chamber 11 is defined within the brake cylinder by the wall 7 and the face of the piston 3 away from the storage spring 5. The chamber 11 is connected to a source of a fluid pressure medium, which is preferably compressed air, through a connection 9. A surface of the braking piston 27 also defines a chamber with the wall 7 which is also connected to the source of compressed air through the connection 9. When the pressure medium is introduced into the chamber 11 to act against the other side of the piston this fluid pressure acts against the force of storage spring 5 to urge the piston 3 into its release position.

Extending from the face of the piston 3 acted upon by the spring 5 is a tubular element or casing 13 within which is a screw or threaded coupling 15 having a non-self-locking thread threadedly engaging a threaded portion on the forward or left-hand third of a spindle shaft 17. The spindle shaft 17 is provided with a stop or abutment 19 which is engageable with an actuating rod or member 21 which slideably passes through the wall 7 by means of an airtight sliding seal or packing. The actuating rod 21 is engageable with the braking piston 27 which is connected through a piston rod to a brake shoe or brake linkage indicated at 23. A return spring 25 acts upon the piston 27 in the direction toward the wall 7. A linkage adjustment mechanism 29 may be provided as shown in FIG. 1 between the actuating member 21 and brake piston 27 and the brake shoe or linkage 23.

The central portion of the spindle shaft 17 passes through the end of the tubular element 13 through an airtight seal or packing so as to be axially displaceable and rotatable therein.

The right-hand end of the spindle shaft 17 as viewed in the drawings is provided with splines at 31 which is engageable with a correspondingly splined opening 35 in a cam sleeve 33. The sleeve 33 has its end facing toward the piston 3 provided with an end wall in which is formed the splined opening 35. The sleeve 33 is rotatably mounted in a portion of the cylinder housing 1 but is retained against axial movement with respect to the cylinder housing. The spindle shaft 17 is axially displaceable with respect to the sleeve 33 through the splined opening 35 but the splined connection between the spindle shaft 17 and sleeve 33 prevents any rotation between the shaft 17 and sleeve 33.

An overrunning drive mechanism 37 which may be in the form of an overrunning clutch operatively connects the sleeve 33 to a mechanical drive mechanism 39 which is operable exteriorly of the cylinder housing. The mechanical drive mechanism 39 preferably comprises a worm shaft engaging a worm gear. The overrunning drive mechanism 37 is operatively connected between the worm gear and the sleeve 33. The worm shaft of the drive mechanism 39 extends outwardly of the cylinder housing so as to be accessible to a point exteriorly of the cylinder housing and is selectively rotatable in both directions either manually or by a suitable drive mechanism which can be selectively controlled by the operating personnel.

The tubular element 13 is provided with abutments or stops which engage stop surfaces 41 on the cylinder housing to determine the position of the piston 3 when the piston is in the brake release position.

The operation of the mechanical release mechanism according the present invention is next described in greater detail based upon the different positions of the individual components as illustrated in FIGS. 1-6.

In its release position in FIG. 1, the spring-loaded brake cylinder is acted upon by compressed air admitted through connection 9 into chamber 11. This air under pressure displaces the piston 3 against the force of storage spring 5 to a position as determined by the stop 41. Return spring 25 acting against braking piston 27 provides for positioning the actuating member 21 on stop 19 of spindle shaft 17 so that the brake 23 is in its release position as illustrated.

Figure 2:
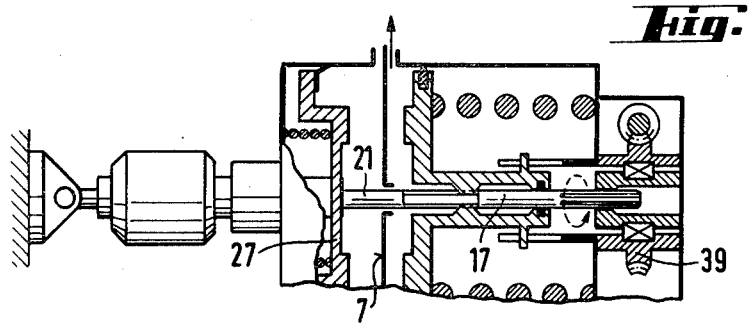
FIG. 2 is a view similar to FIG. 1 but showing the brake cylinder in the braking position.

In the braking position of FIG. 2, the chamber 11 is exhausted through connection 9 such that the storage spring 5 acts upon piston 3, tubular element 13, spindle shaft 17 and actuating member 21 to bring the brake shoe 23 into the braking position as illustrated. The displacement of the piston 3 toward the left as seen in FIG. 2 causes its tubular element 13 to transmit a force to the spindle shaft 17 through the threaded connection 15 having the non-self-locking thread. Accordingly, the spindle shaft 17 is subjected to a torque in the direction of rotation as shown in the dashed lines in FIG. 2. This torque is transmitted from spindle shaft 17 to the sleeve 33 the rotation of which causes the overrunning mechanism 37 to become locked in a driving position. The sleeve 33 is rotated as the spindle shaft is non-rotatably withdrawn from the sleeve because of the meshing between the splined surfaces of the shaft 17 and sleeve 33.

Figure 3:
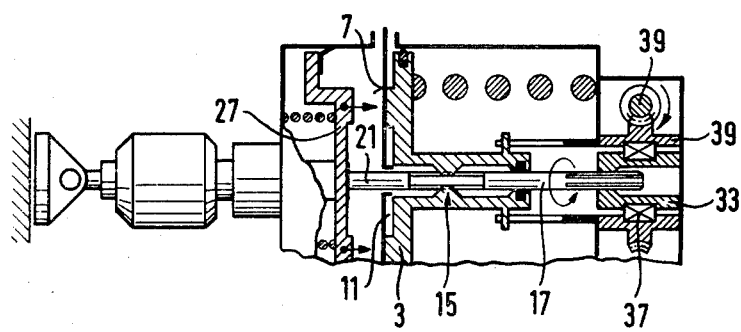
FIGS. 3 and 4 are similar to FIG. 1 and show two successive phases of the spring-loaded brake cylinder wherein the cylinder has been selectively released manually.
Figure 4:
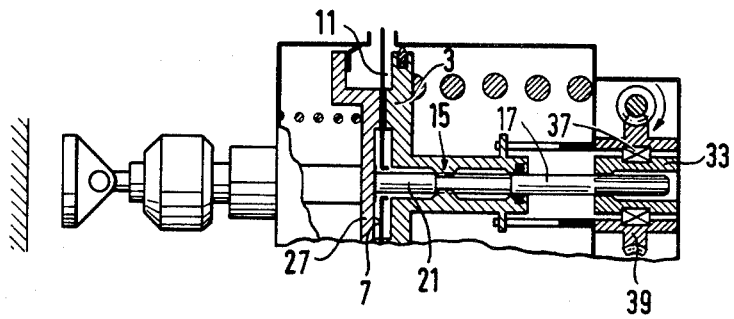

In the event that the spring-loaded brake cylinder brake as shown in FIG. 2 in the braking position cannot be released because of a lack of a pressure medium or malfunctioning of the pressure medium supply, the brake must be released mechanically by means of the drive mechanism 39. FIGS. 3 and 4 illustrate two phases of releasing manually the spring-loaded brake cylinder.

As can be seen in FIG. 2, when the brake 23 is in its braking position the piston 3 is subjected to the force of spring 5 so that the threaded coupling 15 causes a torque to be exerted onto the spindle shaft 17 which in turn is transmitted to the sleeve 33. The torque on spindle shaft 17 and the sleeve 33 is exerted in the direction as shown by the arrow in FIG. 3 and is in the direction to effect and maintain the locking action of the overrunning drive mechanism 37. Thus, if the worm shaft of the drive mechanism 39 is rotated in the direction as indicated in FIG. 3, the worm gear will then drive the sleeve 33 by means of the locked overrunning mechanism 37 and, as result, the spindle shaft 17 will be rotated. The spindle shaft 17 rotates in the direction shown by the arrow in FIG. 3 such that the spring-loaded piston 3 through the threaded coupling 15 is displaced to the left under the action of spring 5 until the piston abuts the partition wall 7. During this phase of the mechanical release operation, the spindle shaft 17 by means of stop 19 and actuating member 21 remains stationary in view of the force transmitted to the right through the brake shoe 23 in the braking position and the force of return spring 25.

The locking effect of the overrunning drive mechanism 37 is maintained with subsequent rotation of the worm shaft of the drive mechanism 39 in the clockwise direction as shown in FIGS. 3 and 4 so that by means of the sleeve 33 rotating the spindle shaft 17, the shaft 17 is displaced toward the right with respect to the piston 3 which is maintained stationary against the partition wall 7. When the operating brake piston 27 is displaced sufficiently to the right so that the piston abuts the partition wall 7 as shown in FIG. 4, the actuating member 21 will no longer exert a force on spindle shaft 17 through the stop 19 and a torque will no longer be exerted upon the spindle shaft 17.

This state of the spring-loaded piston 3 with the positions of the actuating element 21 and the spindle shaft 17 wherein any subsequent rotating of the worm shaft of the drive mechanism 39 will not bring about any further rotation of the sleeve 33 is shown in FIG. 4.

Figure 5:
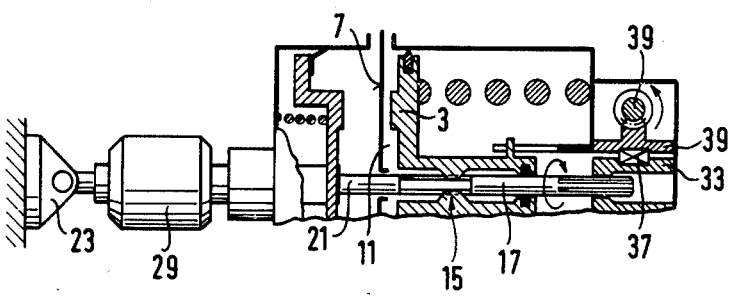
FIG. 5 is a view similar to FIG. 1 and showing the spring-loaded brake cylinder operated manually into the braking position from its components initially in the position as shown in FIG. 4.

Proceeding from the position of the components as shown in FIG. 4 the brake can be manually actuated as illustrated in FIG. 5. For a braking operation, the worm shaft of the drive mechanism 39 must be operated in the opposite or counterclockwise direction as shown in FIG. 5. The overrunning mechanism 37 will then be locked in a driving position because of a small friction caused by rotational resistance acting upon spindle shaft 17 and because of the immediate beginning of the support of the spindle 17 on the spring-loaded piston 3 also preventing rotation. Rotation of the drive mechanism 39 in the counterclockwise direction as shown in FIG. 5 will rotate the sleeve 33 and through the screw coupling the spindle shaft 17. The spindle shaft 17 will be screwed into the spring-loaded piston 3 which is held against movement under the force of spring 5 and shifts the actuating member 21 through the stop 19 to cause the brake shoe 23 to move into the braking position. Further rotation of the spindle shaft 17 will no longer displace the shaft 17 in the direction of the actuating member 21 and the spring-loaded piston 3 will be lifted from its position against the wall 7 through the screw coupling 15. As the piston 3 begins to move away from wall 7, the storage spring 5 will begin to act upon the piston 3 and the brake 23 is released from the braking position by the action of return spring 25 acting upon the brake cylinder 27.

It is to be borne in mind that the manual braking operation shown in FIG. 5 was initiated with the various components in the positions as shown in FIG. 4 wherein the spring-loaded piston 3 as well as the actuating member 21 are stopped in position on the wall 7.

Figure 6:
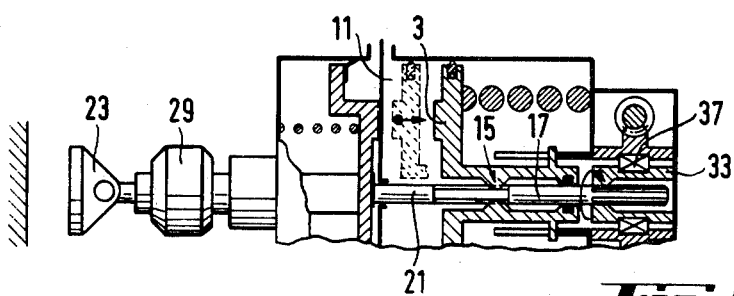
FIG. 6 is a view similar to that of FIG. 1 and showing the piston being returned to its release position under the action of a fluid pressure medium from the position shown in FIG. 5.

When a pressure medium under a suitable release pressure is introduced through connection 9 into the chamber 11, the spring-loaded piston 3 will be lifted from the wall 7 against the force of spring 9 and shifted to the right into the release position against stop 41. The displacement of the piston 3 to the right as seen in FIG. 6 tends to exert a torque in a clockwise direction on the spindle shaft 17 through the screw coupling 15. However, the spindle shaft 17 is not axially displaced with respect to the piston 3 and its splined end 31 axially slides within the splined opening 35 of the sleeve 33 until the piston 3 arrives at its end position against stop 41.

It is apparent that the overrunning drive mechanism 37 is actuated into a locking or driving state when the spindle shaft is subjected to a torque occurring in the brake release direction exerted by the screw coupling 15 in the piston tubular element 13. It is immaterial to the operation of the overrunning drive mechanism 37 whether the rotation of the sleeve 33 is caused by a torque exerted on the spindle shaft 17 in the above-named direction or whether the worm gear of the drive mechanism 39 is subjected to an opposite rotational direction by rotation of the worm shaft.

The mechanical release mechanism for a spring-loaded brake cylinder as disclosed herein can also be constructed as a rapid release mechanism. For a rapid release mechanism it is only necessary to provide a suitable structure to release selectively as may be desired the locked position of the overrunning mechanism. In order to bring the rotating components to a stop with a minimum amount of stress, a damping mechanism such as disclosed in the copending U.S. patent application Ser. No. 974,230, filed Dec. 29, 1978 may be installed at a suitable location.

Thus, it can be seen that the present invention has disclosed a mechanical release mechanism which does not operate against the force of the storage spring acting against the spring-loaded piston and which requires a minimum of operating components.

It will be understood that this invention is susceptible to modification in order to adapt it to different usages and conditions, and accordingly, it is desired to comprehend such modifications within this invention as may fall within the scope of the appended claims.

What is claimed is:

1. In a release mechanism for a spring-loaded brake cylinder particularly in an air braking system on a rail vehicle, a cylinder having a piston therein movable in braking and release directions and having one side acted upon by a spring and another side acted upon by a fluid pressure medium, a spindle shaft having a non-self-locking thread threadedly coupled to said cylinder, an actuating rod adapted to be connected to a brake linkage and engageable by said spindle shaft to be actuable thereby, a sleeve rotatably mounted on said cylinder and non-axially movable with respect thereto, said spindle shaft being axially movably connected to said sleeve and non-rotatable with respect to said sleeve, a drive mechanism operable exteriorly of the brake cylinder, and an overrunning drive means operatively connected between said drive mechanism and said sleeve and locking in driving position when the sleeve is rotated in a direction to unscrew the spindle shaft from said piston in the direction to release the brake.

2. In a release mechanism as claimed in claim 1 and further comprising means for selectively releasing the locked position of said overrunning drive means.

* * * * *